United States Patent
Anderson et al.

(10) Patent No.: US 11,681,628 B2
(45) Date of Patent: *Jun. 20, 2023

(54) MANAGING MEMORY ALLOCATION BETWEEN INPUT/OUTPUT ADAPTER CACHES

(71) Applicant: International Business Machines Corporation, Armonk, NY (US)

(72) Inventors: Clark A. Anderson, Rochester, MN (US); Adrian C. Gerhard, Rochester, MN (US); William J. Maitland, Jr., Lenoxville, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/203,887

(22) Filed: Nov. 29, 2018

(65) Prior Publication Data

US 2019/0095337 A1 Mar. 28, 2019

Related U.S. Application Data

(63) Continuation of application No. 15/198,048, filed on Jun. 30, 2016, now Pat. No. 10,169,241.

(51) Int. Cl.
*G06F 12/00* (2006.01)
*G06F 12/0871* (2016.01)
(Continued)

(52) U.S. Cl.
CPC ...... *G06F 12/0871* (2013.01); *G06F 12/0811* (2013.01); *G06F 12/0831* (2013.01);
(Continued)

(58) Field of Classification Search
CPC ........ G06F 8/456; G06F 8/61; G06F 9/30123; G06F 9/3013
(Continued)

(56) References Cited

U.S. PATENT DOCUMENTS 6,460,122 B1 10/2002 Otterness et al.
6,842,437 B1 * 1/2005 Heath .................... H04B 7/212
370/348

(Continued)

OTHER PUBLICATIONS

Anonymous, "Dynamic Cache Reservation for Virtual Machine Applications in Cloud", an IP.com Prior Art Database Technical Disclosure, IP.com No. 000233167, 7 pages.

(Continued)

*Primary Examiner* — Mohamed M Gebril
(74) *Attorney, Agent, or Firm* — Nathan M. Rau

(57) ABSTRACT

A first cache of a first IOA is detected storing an amount of data that satisfies a memory shortage threshold. A request for extra memory for the first IOA is transmitted. The request is sent in response to detecting that the first cache stores the amount of data that satisfies the memory shortage threshold. The request is transmitted to a plurality of IOAs of a computer system. A second cache of a second IOA is detected storing an amount of data that satisfies a memory dissemination threshold. Memory of the second cache is allocated to the first cache. The memory is allocated in response to the request and the amount of data in the second cache satisfying the memory dissemination threshold.

13 Claims, 3 Drawing Sheets

(51) Int. Cl.
  *G06F 12/0811* (2016.01)
  *G06F 12/0831* (2016.01)
(52) U.S. Cl.
  CPC .............. *G06F 2212/283* (2013.01); *G06F 2212/6046* (2013.01); *G06F 2212/621* (2013.01)
(58) Field of Classification Search
  USPC ........................................................ 711/119
  See application file for complete search history.

(56) References Cited

U.S. PATENT DOCUMENTS

| | | | | |
|---|---|---|---|---|
| 6,985,455 | B1* | 1/2006 | Heath | H04B 7/1858 370/429 |
| 8,874,848 | B2* | 10/2014 | Soundararajan | G06F 12/0813 711/171 |
| 9,634,952 | B2* | 4/2017 | Gopinathan | H04L 43/0876 |
| 9,767,021 | B1* | 9/2017 | Wu | G06F 12/126 |
| 2005/0198411 | A1* | 9/2005 | Bakke | G06F 12/0871 710/22 |
| 2008/0212600 | A1* | 9/2008 | Yoo | H04L 49/90 370/412 |
| 2012/0124294 | A1* | 5/2012 | Atkisson | G06F 12/0804 711/135 |
| 2012/0198174 | A1* | 8/2012 | Nellans | G06F 3/065 711/E12.009 |
| 2013/0138891 | A1* | 5/2013 | Chockler | G06F 12/0893 711/E12.022 |
| 2015/0149731 | A1 | 5/2015 | Auernhammer et al. | |
| 2016/0085674 | A1* | 3/2016 | Sterns | G06F 12/0804 711/143 |
| 2016/0321190 | A1* | 11/2016 | Ash | G06F 12/0868 |
| 2017/0180503 | A1* | 6/2017 | Kelly | H04L 67/1008 |
| 2018/0004673 | A1 | 1/2018 | Anderson et al. | |
| 2018/0018242 | A1* | 1/2018 | Blagodurov | G06F 3/067 |
| 2018/0032433 | A1* | 2/2018 | Ito | G06F 3/0656 |
| 2019/0095337 | A1* | 3/2019 | Anderson | G06F 12/0811 |

OTHER PUBLICATIONS

IBM, "Shared disk I/O Cache", an IP.com Prior Art Database Technical Disclosure, Original Publication Date: Jan. 29, 2004, IP.com No. 000021651, 7 pages.

IBM, et al., "Means for Achieving Optimum of Cache Among Data and Instructions", an IP.com Prior Art Database Technical Disclosure, Original Publication Date : Jan. 1, 1990, Original Disclosure Information: TDB n8A 01-90 pp. 381-383, IP.com No. 000099286, 4 pages.

List of IBM Patents or Patent Applications Treated as Related, Signed Nov. 29, 2018, 2 pages.

* cited by examiner

MANAGING MEMORY ALLOCATION BETWEEN INPUT/OUTPUT ADAPTER CACHES

BACKGROUND

Computer systems may use input/output (I/O) controllers, also called I/O adapters, to manage data coming through an I/O data path. I/O adapters may employ caches to store data for the execution of I/O operations, such as read and write requests. Often I/O adapter caches have redundancies in the form of other I/O adapter caches.

SUMMARY

Embodiments of the disclosure provide a method, system, and computer program product for managing the memory allocation of input/output (I/O) adapters, referred to as IOAs. A first cache of a first IOA is detected storing an amount of data that satisfies a memory shortage threshold. A request for extra memory for the first IOA is transmitted. The request is sent in response to detecting that the first cache stores an amount of data that satisfies the memory shortage threshold. The request is transmitted to a plurality of IOAs of a computer system. A second cache of a second IOA is detected storing an amount of data that satisfies a memory dissemination threshold. Memory of the second cache is allocated to the first cache. The memory is allocated in response to the request and the amount of data in the second cache satisfying the memory dissemination threshold.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
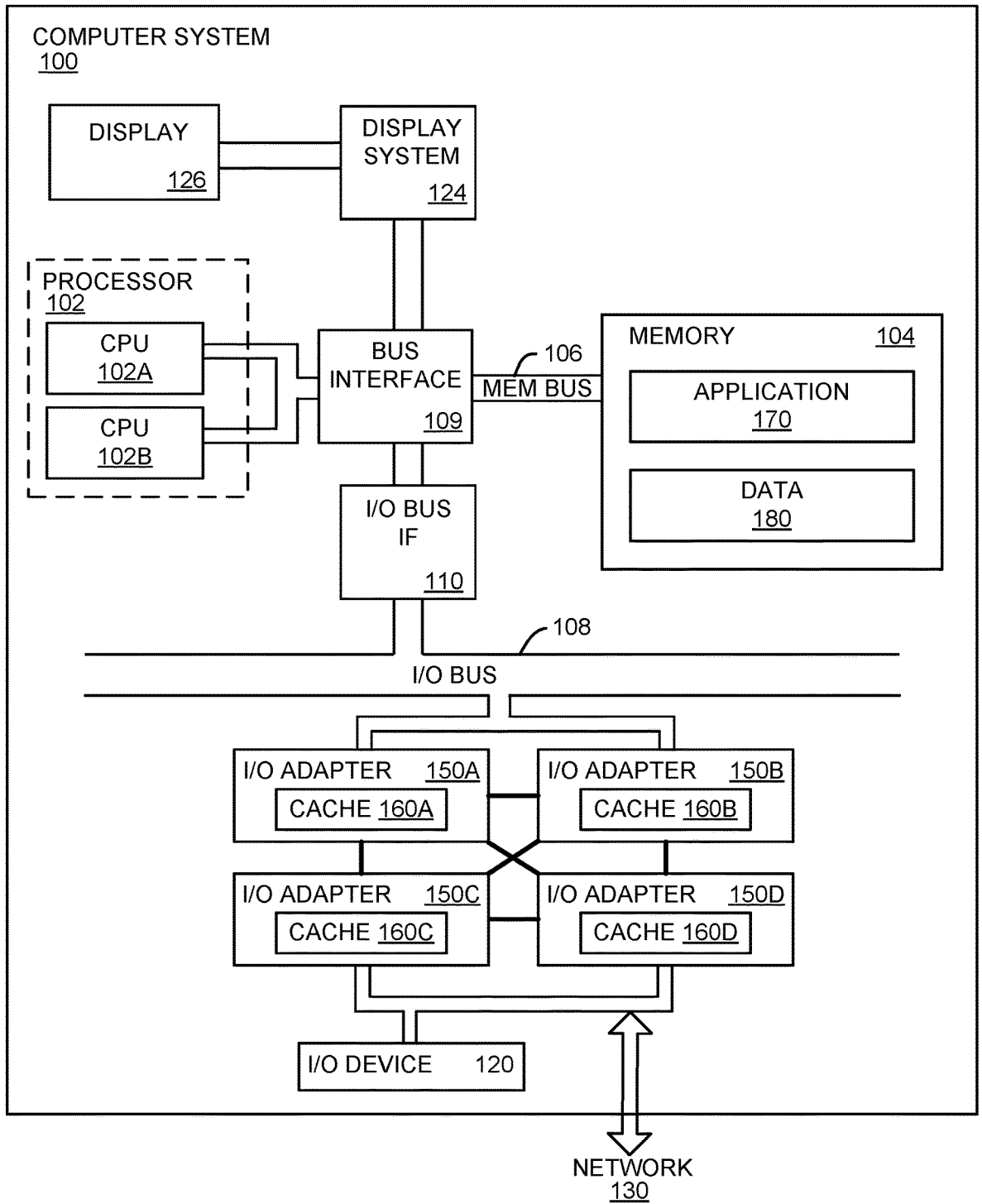
FIG. 1 depicts a high-level block diagram of a computer system 100 for managing the allocation of memory between IOA caches, according to embodiments.

While embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to managing the memory allocation of input/output (I/O) adapters or controllers, referred to hereinafter as IOAs. Each IOA may have a dedicated cache and may not have control over incoming I/O requests. When one IOA has a cache that is almost filled with data from I/O requests while another IOA has a cache that is underutilized, the second IOA may allocate memory from its cache to the cache of the first IOA. While the present disclosure is not necessarily limited to such applications, various aspects of the disclosure may be appreciated through a discussion of various examples using this context. Examples and example values discussed herein are provided by way of example only and are not to be construed as limiting.

In instances, a conventional computing system has IOAs to process I/O requests of a data path. IOAs may have a dedicated cache. Additionally, IOA caches may have redundancies in the form of a second cache. The second cache may be itself dedicated to a second IOA. To take advantage of these dual caches, conventional computing systems transmit I/O data to both the primary cache of a first IOA and the redundant cache of a second IOA. IOA caches of conventional computing systems must therefore have sufficient capacity to store not only all data for its primary IOA but also to store a backup copy of data for the redundant IOA cache. The conventional computing system sends I/O requests to multiple IOAs to gain a performance advantage from the redundancies within the data path. Being as the IOAs within the conventional computing system can control neither how I/O requests are split between redundant IOAs nor how much cache space an I/O request will require, IOAs must pre-allocate enough space for both primary and redundant data. To address this issue, conventional computing systems set hard limits on the amount of cache that can be allocated to a certain type of data. However, when the data of an I/O request is not balanced along the same ratios of the hard limits of the cache, there may be unused and reserved memory within the cache even while the cache is maxed out on one type of data.

Aspects of the disclosure are directed towards managing the allocation of memory between IOA caches. IOAs may share the current usage levels within their caches with other IOAs. When an IOA cache is approaching 100% utilization, the IOA will send a message to other IOAs requesting memory. If a second IOA has a sufficiently high amount of unused memory within its cache, memory may be allocated to the first IOA. Upon allocating from the second IOA to the first IOA, the allocation rules may be modified such that it is relatively easier for the first IOA to allocate away memory (e.g., as a result of the first IOA now having a relatively higher amount of memory) and relatively easier for the second IOA to request memory (e.g., as a result of the second IOA now having a relatively lower amount of memory). In this way IOA caches may be dynamically balanced in response to current I/O demand. The dynamic balancing in response to I/O demand may increase the performance of the I/O process and decrease the backing device access time of devices attached to IOAs.

FIG. 1 depicts a high-level block diagram of a computer system 100 for managing the allocation of memory between IOA caches. The components of the various embodiments disclosed herein apply equally to any appropriate computing system. The components of the example computer system 100 shown in FIG. 1 include a memory 104, and a set of IOAs 150, all of which are communicatively coupled, directly or indirectly, for inter-component communication via a memory bus 106, an I/O bus 108, a bus interface unit 109, and an I/O bus interface unit 110.

The components of the example computer system 100 include links/paths as depicted between IOAs 150. In certain embodiments there may be either more or less links than is depicted within example computer system 100. These data paths may allow for direct communication, whether shared or dedicated, between IOAs 150 using one or more bus/interface between the IOAs 250. In certain embodiments, these direct communication paths may be created using Small Computer System Interface (SCSI) methodology, Serial Attached SCSI (SAS) methodology, Peripheral Component Interconnect Express (PCIE) methodology, or any other methodology known to one skilled in the art.

The computer system 100 includes one or more general-purpose programmable central processing units (CPUs) 102A and 102B, herein generically referred to as the processor or processors 102. In some embodiments, the computer system 100 may contain multiple processors. In other embodiments, the computer system 100 may alternatively be a single CPU system. Each processor 102 executes instructions—such as the instructions from the IOA 150 to perform the acts described with respect to method 200, or instructions relating to data 180 issued from another application 170—stored in the memory 104. Additionally, the IOAs, 150, may also contain one or more CPUs used to process information, perform requests, or implement method 200. In addition, one or more of the functions provided by the bus interface unit 109 may be on board an integrated circuit that also includes the processor 102.

In some embodiments, the memory 104 may include a random-access semiconductor memory, storage device, or storage medium (either volatile or non-volatile) for storing or encoding data and programs. The memory 104 can store the data 160 that is being processed via I/O requests as described herein. IOAs 150 may process the I/O requests. Caches 160 of the IOAs 150 may be used to expedite the processing of I/O requests for an application 170. Each IOA 150A, 150B, 150C may have a respective cache 160. As the back-end storage device or devices, 120 may not be able to keep up large amounts of I/O writes or may have high latency for processing the I/O writes, the IOA caches, 160, allow the I/O response time to remain low and throughput to remain high by buffering the I/O write's data within the IOAs. However, if the back end storage device, 120 is unable to match the rate of incoming I/O writes, a cache 160 for a specific IOA 150A may approach full capacity. In response to a cache 160 of a first IOA 150A approaching full capacity, the IOA 150A may request more memory from other IOAs 150B, 150C. The other IOA 150C may detect that it is under-utilized and may allocate some portion of a cache 160 belonging to IOA 150C to the over-utilized IOA 150A.

In certain embodiments, the memory 104 represents the entire virtual memory of the computer system 100, and may also include the virtual memory of other systems coupled to the computer system 100 or connected via a network 130. In such embodiments, portions of data used by the computer system 100 may be stored externally. For example, in some embodiments some data 180 may be stored in other systems of the network 130 that are analogous to the computer system.

In the depicted embodiment, the computer system 100 includes a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple IOAs, which are also known as I/O processors (IOPs) or I/O interfaces, through the I/O bus 108. The display system 124 may include a display controller, a display memory, or both. The display controller may provide video, audio, or both types of data to a display device 126, such as a standalone display screen, computer monitor, television, or a tablet or handheld device display. The display system 124 may include a dedicated memory for buffering video data.

The IOAs 150 support communication with a variety of storage devices. For example, the computer system 100 and IOAs 150 may support the attachment of SCSI devices, SAS devices, Solid State Drives (SSDs), Spinning Drives (HDDs), optical storage, tape storage, Non-Volatile Memory Express (NVMe) storage, or any devices which may store data. An application 170 may execute on the processor 102 to request the IOAs 150 to store data 180 on the storage device 120. The IOA will buffer this data in cache 160 to avoid the long latency of writing this data out to the storage device 120. For redundancy the IOA will also mirror this cache 160 data to one or more IOA's 150 caches 160. In response to such requests, a cache 160 of an IOA 150 may approach 100% utilization (e.g., a state where 100% of allocated memory of the cache 160 is utilized), so the IOA 150 may request memory of another IOA 150 cache 160 to compensate.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

FIG. 1 depicts several example components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
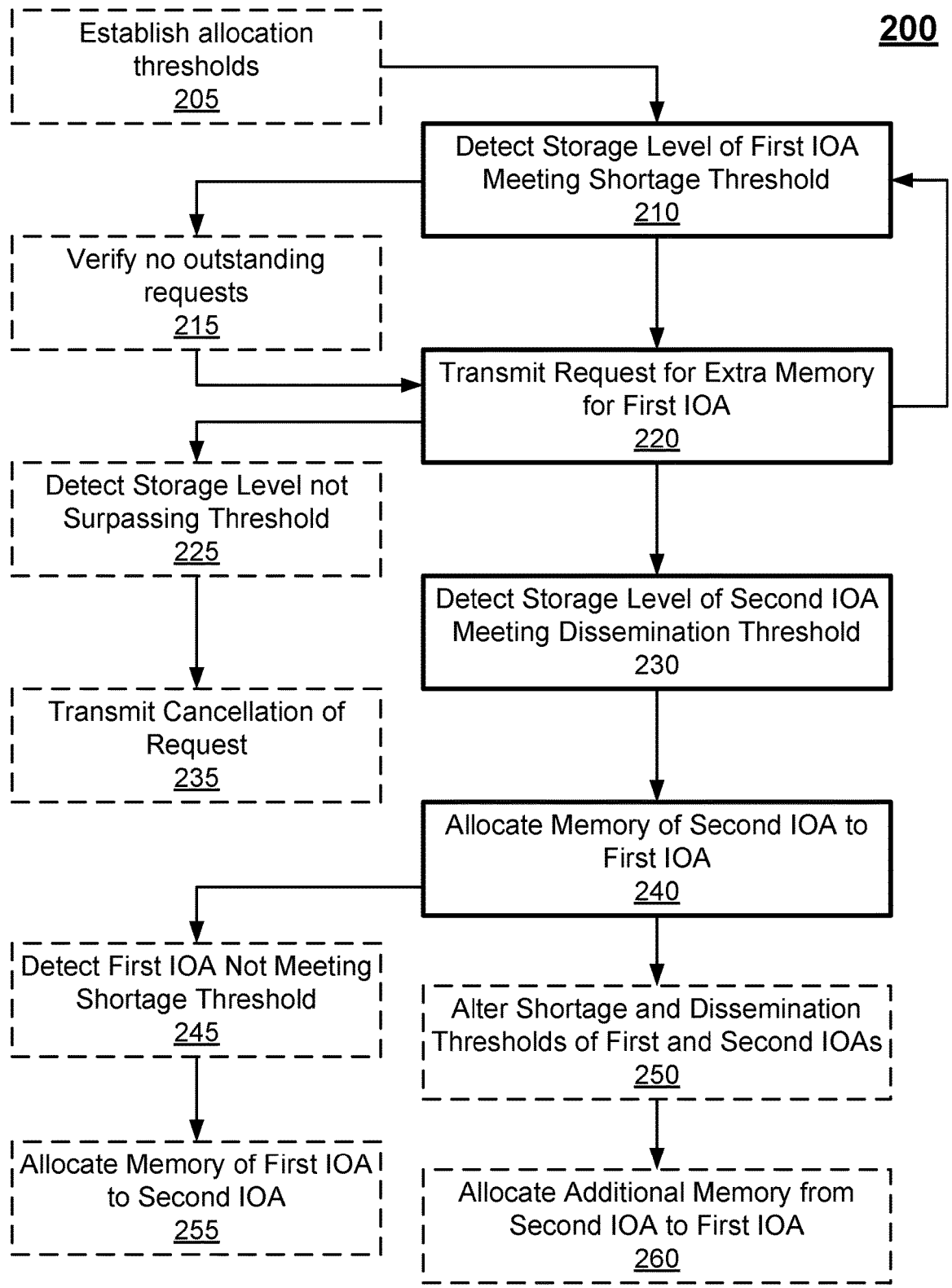
FIG. 2 is a flow chart depicting an example method of managing the memory allocation of IOAs, according to embodiments.

FIG. 2 is a flowchart illustrating a method 200 of allocating memory of IOA caches. The IOAs may be in a computer system analogous to the computer system 100 of FIG. 1. In some embodiments, each IOAs may be one of a set of redundant IOAs (e.g., a set of IOAs that have partially mirrored caches that serve as redundancies for each other) as understood by one skilled in the art. In other embodiments, the IOAs may be within a distributed system (e.g., a nonuniform memory access (NUMA) system) with caches/ IOAs stored on physically remote but connected hardware components. Blocks with hashed lines in FIG. 2 are optional steps within method 200. The visual arrangement of blocks in the flowchart of FIG. 2 is not to be construed as limiting the order in which the individual acts/operations may be performed, as certain embodiments may perform the operations of FIG. 2 in alternative orders.

At block 205 thresholds for allocating memory may be established. Two thresholds may be established for the IOAs. The first threshold may be a memory shortage threshold. The shortage threshold designates a point at which a cache of an IOA has a shortage of available memory. In some embodiments, the shortage threshold is at the amount of memory (or is at more than the amount of memory) at which the IOA is destaging (e.g., writing data out to the storage device, 120) at the max rate of the IOA. The shortage threshold may relate to the amount of memory that is being utilized at a given point. For example, a shortage threshold of seven gigabytes of stored data may be established for a cache that has a capacity of ten gigabytes of data, such that the cache will meet the threshold every time said cache stores seven or more gigabytes of data. In some embodiments, IOA caches may have individual memory shortage thresholds that may be individually modified as described herein.

The second threshold may be a memory dissemination threshold. The dissemination threshold designates a point at which a cache has enough unutilized memory that some memory of said cache may be allocated elsewhere. In some embodiments, the shortage threshold is at the amount of memory (or is at less than the amount of memory) at which the IOA is performing more than background destaging. For example, the cache described above with a capacity of ten gigabytes of data may have a dissemination threshold of four gigabytes of data. In this example, when the cache stores less than four gigabytes of data the cache will satisfy the dissemination threshold. In some embodiments, IOA caches may have individual memory dissemination thresholds that may be individually modified as described herein.

In some embodiments the shortage threshold and dissemination threshold are set once and used for the duration of the computer system. In other embodiments, thresholds may be adjusted over time by a system administrator. In certain embodiments, the thresholds may be adjusted automatically based on other stimuli, such as memory being allocated to or away from the caches for the use of the respective IOAs.

At block 210 a first IOA detects that its cache satisfies the shortage threshold. A cache may satisfy the shortage threshold by having a utilization level (e.g., an amount of data currently stored within the cache) that meets or exceeds a predetermined threshold amount (e.g., the shortage threshold) of utilization of the cache. In order to determine if the first cache satisfies the shortage threshold, the first IOA may determine how much data is stored within the first cache. As understood by one skilled in the art, IOAs are able to determine the amount of data that is stored within a respective cache. In some embodiments, the first IOA may determine how much data is stored within the first cache at fixed intervals (e.g., every few seconds or processor cycles). In other embodiments, the first IOA may determine how much data is stored within the first cache in response to a change in the amount of data that is stored within the first cache. Put differently, the first IOA may determine if the first cache satisfies the shortage threshold every time that the first cache unloads some data or receives some data.

In some embodiments, a memory utilization may be measured—and the shortage threshold therein satisfied—over a period of time rather than at a moment in time. These embodiments may include instances where I/O requests are being rapidly processed, resulting in relatively quick succession between the appropriating of a first cache to data of I/O requests and the resulting destaging (e.g., the act of removing data of an I/O request from a cache following the execution of the I/O request) of completed I/O requests.

For example, a first cache may undergo a sudden and acute increase in memory utilization over a relatively short period of time as a result of a number of received I/O requests. In embodiments where the memory utilization is measured at single moments in time (e.g., a "snapshot" of the memory utilization), if the sudden and acute increase brought the memory utilization over the memory shortage threshold, the first cache would satisfy the memory shortage threshold. However, in other embodiments where memory utilization is measured and averaged over a period of time (e.g., an average memory utilization over the course of a few seconds), if the sudden and acute increase was following by an equally sudden destaging of memory, the first cache may not satisfy the memory shortage threshold. In the latter example, the first cache may fail to satisfy the shortage threshold even if a point in time within the measured period did satisfy the shortage threshold.

In some embodiments, after the first IOA detects that its cache meets the shortage threshold, the IOA may detect that there are no outstanding requests from an IOA for additional memory at block 215. An outstanding request may be a request from an IOA that was previously transmitted to a group of IOAs and has been neither responded to with a memory allocation nor cancelled by the original transmitter. As understood by one skilled in the art, IOAs have the ability to communicate with other IOAs. The IOA may check a central log (e.g., a single list where all requests for memory and allocations for memory are posted) to determine whether or not there are currently any outstanding requests for additional memory. Alternatively, the IOA may check an individual log (e.g., a log which records the requests received by the respective IOA and/or whether said requests have been answered or otherwise followed up on) to determine whether any outstanding requests exist. In yet other embodiments, a master IOA may keep track of all requests for memory and inform an IOA if there is an outstanding request (e.g., the master IOA may inform the first IOA that there is an outstanding request in response to the first IOA satisfying the memory shortage threshold).

If the first IOA identifies an outstanding request, the first IOA may defer a request for memory. The request for new memory may be deferred until the outstanding request has been answered (e.g., responded to with an allocation of memory) or cancelled. In some embodiments, the first IOA may be immediately alerted when an outstanding request has been answered or cancelled (e.g., alerted by a master IOA, or alerted by the IOA which had originally issued the outstanding request). In other embodiments, the first IOA affirmatively verifies whether or not an outstanding request has been answered or cancelled (e.g., affirmatively verifying by asking for and receiving such verification from the master IOA or the originating IOA, or affirmatively verifying by checking a central logs that records all requests/responses/ request cancellations). In such embodiments where an IOA affirmatively verifies whether an outstanding request has been answered or cancelled, the first IOA may periodically check (e.g., check every minute) with the master IOA/ originating IOA/central log whether or not the outstanding request has been answered or cancelled.

At block 220 a request for extra memory for the cache of the first IOA is transmitted. The request may be sent by the first IOA. In other embodiments, the request may be sent by a master IOA that is aware of the cache of the first IOA satisfying its memory shortage threshold. In some embodiments, the request is transmitted in response to verifying that there are no outstanding requests by other IOAs. In other embodiments, the request is transmitted as soon as the first IOA detects that it meets the shortage threshold. The request for extra memory for the first cache may be transmitted to a plurality of IOAs. In some embodiments, the first IOA will transmit the request for additional memory message to all IOAs in the computer system or all IOAs that are accessible. In other embodiments, the first IOA will transmit the request to a single IOA that functions as a master IOA for other IOAs.

In some embodiments, the rate at which IOAs send messages within the computer system may be as fast as the IOAs are able to send messages. In other embodiments, the rate at which IOAs send messages within the computer system may be at a fixed rate (e.g., one message every few seconds). In other embodiments, the rate at which IOAs send messages within the computer system may be a variable rate tied to the performance of the computer system (e.g., the current performance, or the average performance over some period of time), the traffic of the computer system, and/or the amount of memory needed by an IOA.

In certain embodiments, IOAs within a computer system come in pairs, where one IOA is the primary IOA that handles configuration and management for the pair and the other IOA is the subordinate IOA. In such embodiments, the primary IOA of the pair that includes the first IOA will transmit the request to the primary IOAs of the I/O system. Put differently, if the first IOA is a primary IOA, the first IOA may transmit the request to other primary IOAs of the I/O system. If the first IOA is the subordinate IOA, the first IOA may have its primary IOA transmit the request to other primary IOAs of the I/O system. In such embodiments, if the primary IOA needs more cache space, it will send the request to the subordinate IOA. If the subordinate IOA needs more cache space, it will send the request to the primary IOA. In some embodiments, the actual assignment of cache space may be performed by the primary IOA. In other embodiments, the subordinate IOA may be able to assign cache space ownership over that cache space that it had previously been assigned ownership.

In some embodiments, if the first IOA does not receive a response from other IOAs of the I/O system for a certain period (e.g., a period of 60 seconds), the IOA may verify that it still meets the shortage threshold of block 210. The certain period of time may be a predetermined duration threshold. If the first IOA still meets the shortage threshold, a second request for additional memory may be transmitted as per block 220. The duration threshold may be measured in seconds or processor cycles or any other time unit known to one skilled in the art. In this way the first IOA may regularly cycle between blocks 210 and 220 of method 200 for as long as the first IOA satisfies the shortage threshold until the first IOA receives a response.

In some instances, after not receiving a response for a period of time as described, the first IOA may detect that the memory utilization of its cache no longer satisfies the shortage threshold at block 225. In response to detecting that the first cache no longer satisfies the shortage threshold the first IOA may transmit a cancellation of the request at block 235. The first IOA may transmit the cancellation in substantially the same way as the request was transmitted (e.g., to all IOAs, to a single master IOA, to the primary IOA, etc.).

At block 230 a second IOA detects that its cache satisfies the dissemination threshold. In some embodiments, the dissemination threshold is an amount of memory utilized within a cache of an IOA that indicates that said IOA can allocate memory away from the cache. The second cache may satisfy the dissemination threshold when the second cache stores less memory than specified by the dissemination threshold. The amount of memory utilization needed to satisfy the dissemination threshold may be a relatively small amount of memory, such that a cache that can allocate away memory has a relatively large amount of capacity when the dissemination threshold is satisfied. The relatively large amount of capacity at the moment that the dissemination threshold is satisfied may mean that the cache is relatively unlikely to approach full memory utilization within the near future.

The second IOA may have determined that its cache (e.g., the second cache) satisfied the dissemination threshold in response to receiving the request that was sent at block 220. Put differently, in some embodiments the second IOA will only determine if the second cache satisfies the dissemination threshold in response to receiving the request from block 220. Alternatively, in other embodiments, the second IOA may periodically or continuously determine whether the second cache satisfies the dissemination threshold regardless of whether or not a request has been received. In some embodiments, the memory utilization of the second cache may be measured—and the dissemination threshold therein satisfied—over a period of time rather than at a moment in time, in a substantially similar way to how the memory shortage threshold is described above.

In response to determining that the second cache satisfies the dissemination threshold, the second IOA allocates memory of its cache to the cache of the first IOA at block 240. The second IOA may allocate a certain amount of pages of memory to the cache of the first IOA. The amount of memory which is allocated to the cache of the first IOA may be predetermined. In some embodiments, the second IOA may allocate a certain percentage of unutilized memory (e.g., 25% of unutilized memory of the second cache). In other embodiments, the second IOA may allocate a certain percentage of memory that exceeds the memory shortage threshold of the second cache. For example, the second cache may have a capacity of ten gigabytes, a memory shortage threshold of eight gigabytes, a dissemination threshold of five gigabytes, and a current utilization threshold of three gigabytes. If, in this example, the second cache has a policy of allocating away 50% of memory which exceeds the shortage threshold, the second IOA may allocate away one gigabyte (e.g., half of the two gigabytes which exceeded the shortage threshold of eight gigabytes) to the first cache.

In certain embodiments, the request sent at block 220 will identify a specific amount of memory the first IOA requires to bring the first cache under the memory shortage threshold. In such embodiments, at block 240 the second IOA may identify if the second cache has enough unutilized memory to provide the specific amount of memory (e.g., the second IOA may determine whether or not allocating away the specific amount of memory will bring the second cache below the memory shortage threshold). If the second cache does have a sufficient amount of unutilized memory to allocate away the specific amount of memory, at block 240 the second IOA may allocate the specific amount of memory to the first cache. However, as understood by one skilled in the art, some IOAs may only have capacity for a certain amount of memory; it may be difficult or impossible for such an IOA to receive memory over this certain amount, even if at this certain amount the IOA is over the shortage threshold and another IOA is under its respective dissemination threshold. In some embodiments, an IOA which had such a memory "ceiling" is aware of said memory ceiling, and the IOA may therein never request an allocation of memory which would put the IOA over said memory ceiling.

In some embodiments, the second IOA will continue allocating increments of memory to the first cache until the first cache has enough memory to fall under (e.g., stop satisfying) the memory shortage threshold. An increment of memory could be one or more pages (or other memory units known to one skilled in the art) of the second cache. The first IOA may send a message to the second IOA when the first IOA thusly stops satisfying the shortage threshold. The second IOA may stop allotting increments of memory to the first cache in response to this message (e.g., the memory indicating that the first IOA has enough memory). Alternatively, the second IOA may stop allotting increments of memory to the first cache in response to the second cache raising over (e.g., stop satisfying) the dissemination threshold. If, at any point, the second cache has no more memory to allocate to the first cache, the second IOA may send a message to the first IOA indicating that the second cache cannot allocate more memory. In certain embodiments, after an increment of memory is received from the second IOA, the first IOA may alter the shortage threshold of the first cache as described below. Similarly, in certain embodiments the second IOA may alter the dissemination threshold of the second cache as described below after an increment of memory is allocated to the first cache.

At block 250 the thresholds of the first IOA and the second IOA may be altered. The thresholds may be altered to suit the new capacities of the respective caches. For example, using the ten gigabyte cache with the seven gigabyte shortage threshold and the four gigabyte dissemination threshold discussed above at block 205, the thresholds may be adjusted to maintain the original percentages while changing the hard values. For example, suppose the first cache and second cache initially both had 10 gigabytes, before at block 240 two gigabytes were allocated from the second cache to the first cache. Given as the shortage threshold was at 70% (e.g., seven gigabytes out of ten gigabytes) and the dissemination threshold was at 40% (e.g., four gigabytes out of ten gigabytes), the shortage and dissemination threshold of the first cache may be altered to, respectively, 8.4 gigabytes and 4.8 gigabytes (e.g., 70% percent of 12 and 40% of 12). Conversely, the shortage and dissemination threshold of the second cache may be altered to, respectively, 5.6 gigabytes and 3.2 gigabytes (e.g., 70% percent of 8 and 40% of 8). This will result in the second IOA being more conservative in allocating away its memory and the first IOA being more liberal in allocating away its memory. In this way the IOAs may dynamically balance memory across caches according to ongoing usage and capacity.

In some embodiments at block 245 the first IOA will detect that it no longer satisfies the shortage threshold. The first IOA may no longer satisfy the shortage threshold as a result of data on the cache of the first IOA being destaged (e.g., moved from cache to the back end storage device 120). In response to the cache of the first IOA no longer satisfying the shortage threshold, at block 255 the first IOA may assign memory back to the second IOA. The first IOA may allocate the same amount of memory to the second IOA which the second IOA allocated to the first IOA at block 240.

Alternatively, in some embodiments at block 260 more memory may be allocated from the cache of the second IOA to the cache of the first IOA. In certain embodiments, this may be the result of the second IOA transmitting an inquiry to the first IOA following the initial allocation of memory to the cache of the first IOA. The inquiry may inquire as to whether or not the initial allotment of memory was sufficient to reverse the ongoing/impending memory shortage of the first IOA. In certain embodiments, the first IOA will determine the initial allotment of memory to be sufficient if its cache does not satisfy the new memory shortage threshold determined at block 250. Other tactics for determining if the initial allotment of memory is sufficient are also possible. The first IOA may indicate to the second IOA whether or not the initial allotment was sufficient with an affirmative indicator (e.g., an indicator indicating that the cache of the first IOA still needs memory) or a negative indicator (e.g., an indicator indicating that the cache of the first IOA no longer needs memory). If the second IOA receives a negative indicator the second IOA may do nothing, while if the second IOA receives an affirmative indicator the second IOA may allocate a second allotment of memory. In certain embodiments, the second IOA will only allocate a second allotment of memory if the cache of the second IOA stores an amount of memory that satisfies the lowered storage dissemination threshold determined at block 250.

Figure 3A:
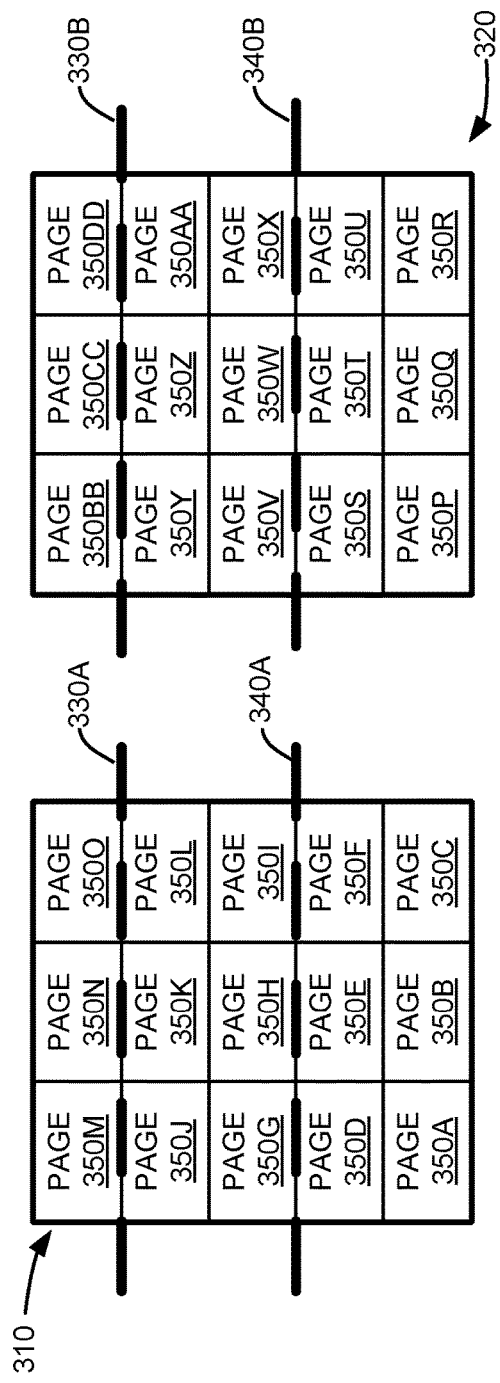
FIG. 3A is a depiction of a first IOA cache and a second IOA cache before memory has been allocated, according to embodiments.

FIG. 3A is a depiction of page allocations of a first IOA cache 310 and a second IOA cache 320 before memory has been reallocated. The first IOA cache 310 and the second IOA cache 320 have a number of data pages 350A-DD to which a respective first IOA and second IOA may write data. The amount of pages 350 depicted within the caches is purely for purposes of illustration; it is to be understood that any number of pages 350 may be present within the caches. The depiction of the first cache 310 and the second cache 320 as two distinct entities is purely for purposes of clarity, as in some embodiments both caches 310, 320 may be manifested in a single physical memory component or more than two physical memory components.

Both the first cache 310 and the second cache 320 have a dissemination threshold 340 and a shortage threshold 330. As depicted in FIG. 3A, the shortage threshold 330A-B for both the first cache 310 and the second cache 320 is at twelve pages 350, such that a utilization of twelve or more pages 350 will satisfy the shortage threshold 330. Similarly, as depicted in FIG. 3A, the dissemination threshold 340A-B for both the first cache 310 and the second cache 320 is at six pages 350, such that a utilization of six or less pages 350 will satisfy the dissemination threshold 340. While one skilled in the art will understand that data may be written to any page 350 of a cache at a given time for different purposes, for purposes of illustration the thresholds are depicted as physical manifestations wherein pages 350 of the cache are written to from the depicted bottom to the depicted top of the caches. In reality, the shortage threshold 330 and dissemination threshold 340 are derived values which are determined and satisfied by analyzing the amount of data which is currently stored in a respective cache, as described above.

In some embodiments, until one of the two caches 310, 320 satisfies the shortage threshold 330, no memory will be allocated between the two and no requests will be made between the two. For example, if the first cache 310 holds data in pages 350A-K and the second cache 320 holds data in pages 350P-T then messages will not be sent and memory pages will not be allocated between the IOAs of the two caches 310, 320. Until one of the caches 310, 320 satisfies the shortage threshold 330, the computer system will not reallocate memory.

In FIG. 3A a first IOA may detect that a first cache 310 satisfies the shortage threshold 330A. The first cache 310 may satisfy the shortage threshold 330A by storing data in the majority of the pages 350 of the first cache 310. For example, pages 350A-350M may store data, meaning that pages 350N and 350O are the only pages 350 in the first cache 310 that do not store data. Pages 350A-350M surpass the shortage threshold 330A, therefore the shortage threshold 330A is satisfied. In response to detecting that the first cache 310 satisfies the shortage threshold 330A, the first IOA sends a request for memory to other IOAs, such as the IOA associated with the second cache 320.

The second IOA may detect that the second cache 320 satisfies the dissemination threshold 340B. For example, the only pages 350 in the second cache 320 that store data may be 350P-350S. Pages 350P-350S do not rise to the dissemination threshold 340B, therefore the second cache 320 can allocate some memory to the first cache 310 of the first IOA.

Figure 3B:
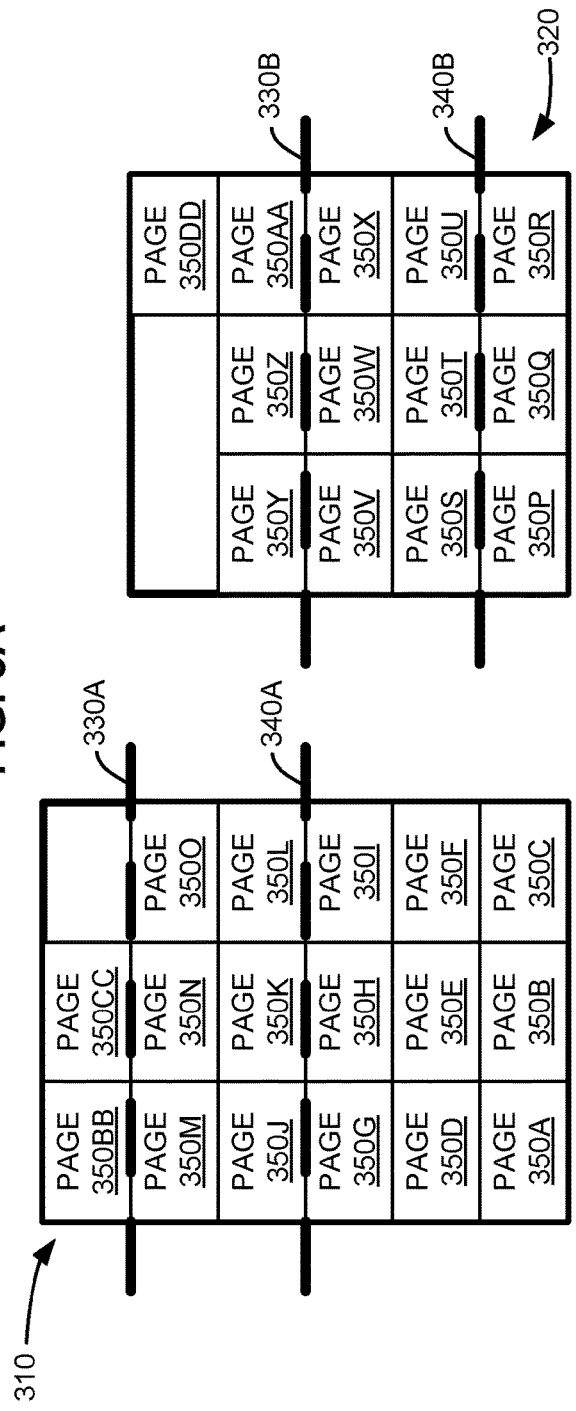
FIG. 3B is a depiction of a first IOA cache and a second IOA cache after memory has been allocated, according to embodiments.

FIG. 3B is a depiction of page allocations for a first IOA cache 310 and a second IOA cache 320 after memory of IOA cache 320 in FIG. 3A has been allocated to the first IOA. The second IOA has allocated pages 350BB and 350CC to the first cache 310. Pages 350BB and 350CC may remain in the same physical location within a computer system even as they allocated to a new cache 310. Put differently, FIG. 3B depicts the adjustment of allocation of pages 350 from a first cache 310 to a second cache 320; FIG. 3B does not intend to depict the physical movement of the actual pages 350.

As depicted within FIG. 3B, both the first cache 310 and the second cache 320 have altered dissemination and shortage thresholds 330, 340. For the first cache 310, the shortage threshold 330A is now at fifteen pages 350, such that the first IOA will not request more pages 350 until the first caches 310 stores data at fifteen or more pages 350. Conversely, for the second cache 320 the shortage threshold 330B is now at nine pages 350, such that the second IOA will request more pages 350 when the second cache 320 stores data at nine or more pages 350. Similarly, the dissemination threshold 340A for the first cache 310 is at nine pages 350, while the dissemination threshold 340B for the second cache 320 is now at three pages 350.

The functionality outlined in the discussions herein regarding FIG. 1, FIG. 2, and FIG. 3 above can be implemented using program instructions executed by a processing unit, as described in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for managing memory allocation of caching storage input/output adapters (IOAs) in a redundant caching configuration, the method comprising:
   detecting a first cache of a first IOA storing a first amount of data that satisfies a memory shortage threshold of the first cache, wherein the memory shortage threshold is based upon a destaging rate of the first IOA;
   transmitting a first request for extra memory for the first cache, wherein the first request is transmitted to a plurality of IOAs;
   detecting a second cache of a second IOA of the plurality of IOAs storing a second amount of data that satisfies a memory dissemination threshold of the second cache;
   allocating memory from the second cache to the first cache;
   detecting the second cache storing a third amount of data that satisfies a memory shortage threshold of the second cache;
   transmitting a second request for extra memory for the second cache, wherein the second request is transmitted to a plurality of IOAs;
   detecting the second cache storing an amount of data that does not satisfy the memory shortage threshold of the second cache before memory has been allocated to the second cache; and
   transmitting a cancellation of the second request, wherein the cancellation of the second request is transmitted to the plurality of IOAs.

2. The method of claim 1, wherein the first cache has a memory dissemination threshold and the second cache has a memory shortage threshold, further comprising:
   raising the memory shortage threshold and the memory dissemination threshold of the first cache, wherein both the raised memory shortage threshold and the raised memory dissemination threshold of the first cache require more data to be stored in the first cache; and
   lowering the memory shortage threshold and the memory dissemination threshold of the second cache, wherein both the lowered memory shortage threshold and the lowered memory dissemination threshold of the second cache require less data to be stored in the second cache.

3. The method of claim 2, further comprising:
   transmitting an inquiry from the second IOA to the first IOA, wherein the inquiry inquires whether the first amount of data satisfies the raised memory shortage threshold of the first cache;
   transmitting an affirmative indicator from the first IOA to the second IOA, wherein the affirmative indicator indicates that the first amount of data satisfies the raised memory shortage threshold of the first cache; and
   allocating an additional portion of memory from the second cache to the first cache.

4. The method of claim 3, further comprising:
   determining that the second amount of data satisfies the lowered memory dissemination threshold of the second cache; and
   wherein the transmitting the inquiry from the second IOA to the first IOA is in response to determining that the second amount of data satisfies the lowered memory dissemination threshold of the second cache.

5. The method of claim 1, wherein the first cache has a memory dissemination threshold and the second cache has a memory shortage threshold, further comprising:
   detecting the second cache storing a fourth amount of data that satisfies a memory shortage threshold of the second cache;
   transmitting a second request for extra memory for the second cache, wherein the second request is transmitted to a plurality of IOAs;
   detecting that the second request has not resulted in an allocation of memory to the second cache for a period of time that satisfies a duration threshold; and
   transmitting a new request for extra memory for the second cache, wherein the new request is transmitted to the plurality of IOAs.

6. A computer system comprising:
   a first input/output adapter (IOA) configured to receive and route input/output (I/O) requests;
   a first cache of the first IOA;

a second IOA configured to receive and route I/O requests;
a second cache of the second IOA;
an I/O bus communicatively coupling the first IOA to the second IOA such that messages may be sent directly between the first IOA and the second IOA; and
a first dedicated processing circuit communicatively coupled to the first IOA and a second dedicated processing circuit communicatively coupled to the second IOA, wherein the first and second dedicated processing circuits are configured to:
detect the first cache storing a first amount of data that satisfies a memory shortage threshold of the first cache, wherein the memory shortage threshold is based upon a destaging rate of the first IOA;
transmit a first request for extra memory for the first cache, wherein the first request is transmitted to a plurality of IOAs;
detect the second cache of the plurality of IOAs storing a second amount of data that satisfies a memory dissemination threshold of the second cache;
allocate memory from the second cache to the first cache;
detect the second cache storing a third amount of data that satisfies a memory shortage threshold of the second cache;
transmit a second request for extra memory for the second cache, wherein the second request is transmitted to a plurality of IOAs;
detect the second cache storing an amount of data that does not satisfy the memory shortage threshold of the second cache before memory has been allocated to the second cache; and
transmit a cancellation of the second request wherein the cancellation of the second request is transmitted to the plurality of IOAs.

7. The computer system of claim 6, wherein the first cache has a memory dissemination threshold and the second cache has a memory shortage threshold, wherein the one or more processing circuits are further configured to:
raise the memory shortage threshold and the memory dissemination threshold of the first cache, wherein both the raised memory shortage threshold and the raised memory dissemination threshold of the first cache require more data to be stored in the first cache; and
lower the memory shortage threshold and the memory dissemination threshold of the second cache, wherein both the lowered memory shortage threshold and the lowered memory dissemination threshold of the second cache require less data to be stored in the second cache.

8. The computer system of claim 7, wherein the one or more processing circuits are further configured to:
transmit an inquiry from the second IOA to the first IOA, wherein the inquiry inquires whether the first amount of data satisfies the raised memory shortage threshold of the first cache;
transmit an affirmative indicator from the first IOA to the second IOA, wherein the affirmative indicator indicates that the first amount of data satisfies the raised memory shortage threshold of the first cache; and
allocate an additional portion of memory from the second cache to the first cache in response to the affirmative indicator.

9. The computer system of claim 8, wherein the one or more processing circuits are further configured to determine that the second amount of data satisfies the lowered memory dissemination threshold of the second cache; and
wherein the transmitting the inquiry from the second IOA to the first IOA is in response to determining that the second amount of data satisfies the lowered memory dissemination threshold of the second cache.

10. The computer system of claim 6, wherein the first cache has a memory dissemination threshold and the second cache has a memory shortage threshold, wherein the one or more processing circuits are further configured to:
detect the second cache storing a fourth amount of data that satisfies a memory shortage threshold of the second cache;
transmit a second request for extra memory for the second cache in response to detecting that the second cache stores the amount of data that satisfies the memory shortage threshold of the second cache, wherein the second request is transmitted to a plurality of IOAs;
detect that the second request has not resulted in an allocation of memory to the second cache for a period of time that satisfies a duration threshold; and
transmit a new request for extra memory for the second cache, wherein the new request is transmitted to the plurality of IOAs.

11. A computer program product for managing memory allocation of input/output adapters (IOAs), the computer program product disposed upon a computer readable storage medium, the computer program product comprising computer program instructions that, when executed by a computer processor of a computer, cause the computer to:
detect a first cache of a first IOA storing a first amount of data that satisfies a memory shortage threshold of the first cache, wherein the memory shortage threshold is based upon a destaging rate of the first IOA;
transmit a first request for extra memory for the first cache in response to detecting that the first amount of data satisfies the memory shortage threshold, wherein the first request is transmitted to a plurality of IOAs;
detect a second cache of a second IOA of the plurality of IOAs storing a second amount of data that satisfies a memory dissemination threshold of the second cache; and
allocate memory from the second cache to the first cache in response to both the first request and detecting that the second amount of data satisfies the memory dissemination threshold
wherein the first cache has a memory dissemination threshold and the second cache has a memory shortage threshold, wherein the computer program product further comprise instruction that, when executed by the computer processor, cause the computer to:
detect the second cache storing a third amount of data that satisfies a memory shortage threshold of the second cache;
transmit a second request for extra memory for the second cache in response to detecting that the second cache stores the amount of data that satisfies the memory shortage threshold of the second cache, wherein the second request is transmitted to a plurality of IOAs;
detect the second cache storing an amount of data that does not satisfy the memory shortage threshold of the second cache before memory has been allocated to the second cache; and
transmit a cancellation of the second request in response to detecting that the second cache stores the amount of data that does not meet the memory shortage threshold of the second cache, wherein the cancellation of the second request is transmitted to the plurality of IOAs.

12. The computer program product of claim 11, wherein the computer program product further comprise instruction that, when executed by the computer processor, cause the computer to determine that the second amount of data satisfies the lowered memory dissemination threshold of the second cache; and
wherein the transmitting the inquiry from the second IOA to the first IOA is in response to determining that the second amount of data satisfies the lowered memory dissemination threshold of the second cache.

13. The computer program product of claim 11 further comprising instructions to:
raise the memory shortage threshold and the memory dissemination threshold of the first cache in response to allocating memory from the second cache to the first cache, wherein both the raised memory shortage threshold and the raised memory dissemination threshold of the first cache require more data to be stored in the first cache; and lower the memory shortage threshold and the memory dissemination threshold of the second cache in response to allocating memory from the second cache to the first cache, wherein both the lowered memory shortage threshold and the lowered memory dissemination threshold of the second cache require less data to be stored in the second cache;

transmit an inquiry from the second IOA to the first IOA, wherein the inquiry inquires whether the first amount of data satisfies the raised memory shortage threshold of the first cache;

transmit an affirmative indicator from the first IOA to the second IOA, wherein the affirmative indicator indicates that the first amount of data satisfies the raised memory shortage threshold of the first cache; and allocate an additional portion of memory from the second cache to the first cache in response to the affirmative indicator.

\* \* \* \* \*